Figure 1:
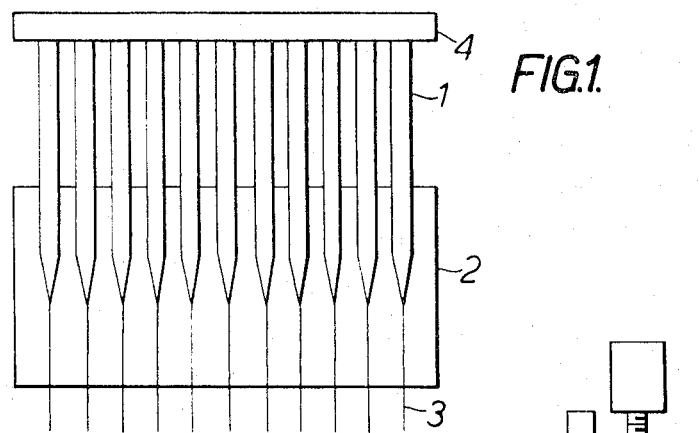

United States Patent
Elliot

[11] 3,767,372
[45] Oct. 23, 1973

[54] APPARATUS FOR MANUFACTURING A MULTI-FILAMENT LIGHT CONDUCTING CABLE

[75] Inventor: Ian Robertson Elliot, Leeds, England

[73] Assignee: The Rank Organisation Limited, London, England

[22] Filed: Oct. 21, 1971

[21] Appl. No.: 191,438

Related U.S. Application Data

[62] Division of Ser. No. 26,237, April 7, 1970, Pat. No. 3,655,352.

[30] Foreign Application Priority Data
Apr. 25, 1969 Great Britain.................... 21,319/69

[52] U.S. Cl.................................. 65/13, 65/DIG. 7
[51] Int. Cl............................................ C03b 23/04
[58] Field of Search....................... 65/DIG. 7, 13, 4

[56] References Cited
UNITED STATES PATENTS

| | | | |
|---|---|---|---|
| 3,193,363 | 7/1965 | Hicks, Jr. et al............................ | 65/4 |
| 3,328,143 | 6/1967 | Hicks, Jr............................ | 65/DIG. 7 |
| 3,622,292 | 11/1971 | Fleck ........................................ | 65/4 |
| 3,055,050 | 9/1962 | Schuller et al...................... | 65/13 X |
| 3,033,071 | 5/1962 | Hicks................................ | 65/DIG. 7 |

*Primary Examiner*—Frank W. Miga
*Attorney*—Griffin, Branigan and Kindness

[57] ABSTRACT

An apparatus for manufacturing a continuous multi-filament light conducting cable includes a furnace and conveyors having holders thereon for holding rods of light conducting material in parallel relationship. The conveyors move the rods axially and transversely into the furnace to melt the rods in turn into individual light conducting filaments. A drawing means then draws the ends of the melted rods into a multi-filament cable.

12 Claims, 6 Drawing Figures

APPARATUS FOR MANUFACTURING A MULTI-FILAMENT LIGHT CONDUCTING CABLE

This is a division of application Ser. No. 26,237 filed Apr. 7, 1970 now U.S. Pat. No. 3,655,352.

This invention relates to the manufacture of continuous multi-filament light conducting cables.

The most common method of manufacturing light conducting optical glass filaments consists in feeding axially a rod of glass, usually consisting of a core contained within a sheath of glass of lower refractive index, into a furnace and drawing the melted leading end out into a filaments.

A known method of manufacturing a cable comprising a bundle of filaments is the same as that for manufacture of a single filaments as described above, several identical rods being fed simultaneously into the furnace, the several filaments being brought together to make a bundle.

The known method of making a bundle of filaments suffers from the disadvantage that the length of the bundle is limited by the length of the rods, i.e. the amount of material in each rod will make a filament of a specific length. When the rods have been completely melted or when they have reached the minimum length which can be handled conveniently the process must be halted and then restarted using fresh rods. Although a considerable amount of machine-operating time is lost while the process is halted for the fitting of fresh rods this loss of time has had to be accepted because there was no known way of avoiding it. The task to be performed in providing bundles of any length as a continuous operation is to overcome the limitation of having to utilize filaments of finite length.

A known method of producing a continuous filament has been proposed and comprises feeding rods of finite length one after another into a heated nozzle block, each fresh rod being melted in a pocket in the nozzle block in the molten residue of the previous rod and the filament being drawn continuously from an outlet of the nozzle block. To produce a plurality of filaments simultaneously, the nozzle block must be provided with a plurality of individual pockets into which individual rods are fed one after the other. This arrangement does provide for the creation of a continuous multi-filament cable of infinite length, but suffers from the disadvantage of requiring a nozzle block which must be accurately machined and furthermore must be designed to withstand the high temperatures, of the order of 1,100° C, of the furnace. In actual fact, the pockets must be formed as positions to take account of thermal expansion of the block if, as is usual, it is formed of a material which expands when heated. The provision of this block makes the apparatus costly and difficult to produce. Furthermore, there is always the possibility of one or more of the outlets of the nozzle block becoming clogged.

It is an object of the present invention to provide an apparatus for producing a continuous multi-filament light conducting cable.

Apparatus according to the invention comprises a furnace, feed means, holder means connected to said feed means and adapted to hold rods of light conducting material in parallel relationship, said feed means being operatively positioned in relation to said furnace so as to feed said rods in sequence transversely and axially into said furnace to melt the rods in turn into individual light conducting filaments, said holding means being adapted to hold the rods parallel during the feeding thereof, and drawing means operative when the ends of said rods have been melted into filaments to draw such filaments into a multi-filament cable.

The feed means may be arranged to move the rods in a flat plane or in a curved feed, the furnace being correspondingly formed.

The means may be conveyor belts and the holder means holders fitted to the belts. Preferably, adjacent holders are all spaced the same unit of distance apart.

The belt of at least one of the conveyors may be oblique with respect to the axes of the rods.

In the construction described in the preceding paragraph the belt of one conveyor may be at right angles to the axes of the rods so that this conveyor, through its holders is capable of imparting transverse movement only to the rods, the belt of the other conveyor being oblique with respect to the axes of the rods so that said other conveyor, through its holders is capable of imparting a transverse component of movement to the rods and an axial component of movement for axial feed to the rods, the conveyors being geared to one another so that the rates of circulation of the respective belts remain in the required fixed constant ratio to provide the required ratio of transverse movement and axial feed.

Alternatively, the two conveyors may be disposed with their belts parallel with one another, and oblique with respect to the axes of the rods. This construction has the advantage that both conveyors always circulate at the same speed with respect to one another thus avoiding complication in the apparatus.

The angle of the oblique conveyor may be variable with respect to the axes of the rods so that the rate of transverse movement of the rods may be varied with respect to the rate of axial feed. In the construction last mentioned in which one conveyor is oblique and one is at right angles to the axes of the rods the gear ratio between the conveyors must also be variable.

The apparatus may incorporate automatic means for inserting fresh rods of maximum length and removing rods of minimum length.

Rods of certain substances of high viscosity and/or high surface tension tend to produce filaments which have enlarged leading ends. A filaments having such an enlarged end cannot be accommodated in a bundle of filaments in a cable and in such circumstances the process may additionally consist in removing the enlarged leading end from the melted end of each fresh rod placed in the position vacated by an immediately preceding rod before said fibre is incorporated in the bundle.

The method of removing an enlarged leading end from a filament may consist in sensing the presence of the enlarged end, then cutting the end from the filament whereby to leave a free-hanging cut end and blowing the free-hanging cut end of the filament towards the other filaments in the furnace in process of forming the cable.

Apparatus for performing the method of removing the enlarged leading end from a filament may consist of an optical sensing device such as a photo-electric cell, a relay controlled by the photo-electric cell and a cutter mechanism operation of which is under the control of the relay.

Figure 2:
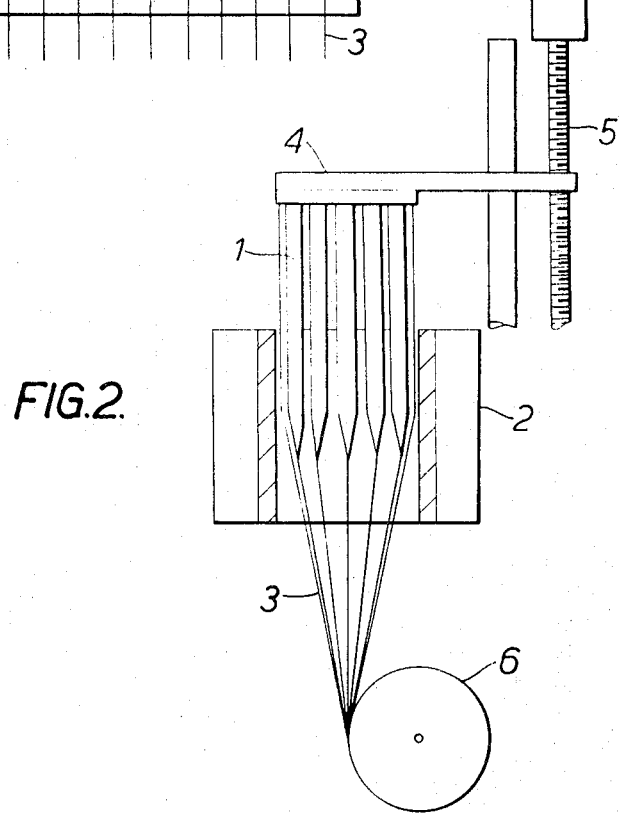
Figure 3:
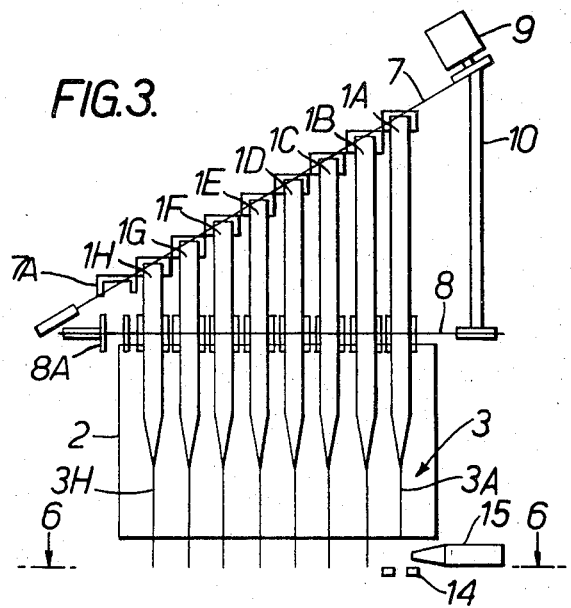
Figure 4:
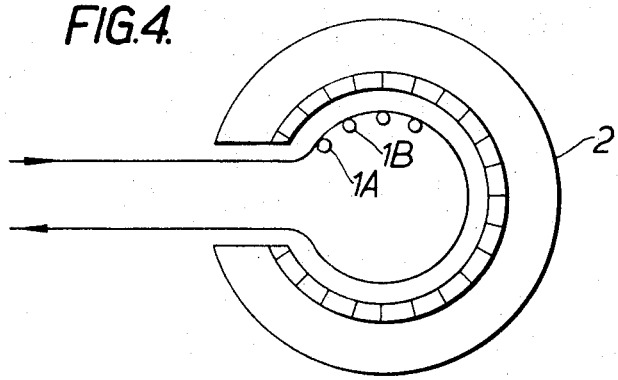
Figure 5:
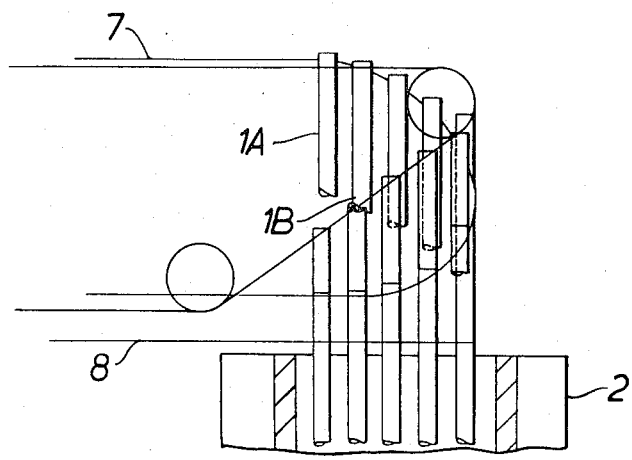
Figure 6:
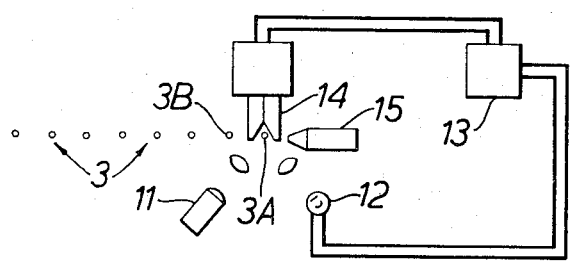

The accompanying diagrammatic drawings illustrate in FIGS. 1 and 2 conventional apparatus for manufacturing multi-filament light conducting cables of finite length, in FIG. 3 apparatus according to the invention in which the rods are moved transversely and axially in a flat plane and in FIGS. 4 and 5 apparatus according to the invention in which the rods are moved transversely and axially in a curved plane;

FIG. 6 is a section through the line 6—6 in FIG. 3. The construction illustrated in FIG. 6 is to be considered as also applicable to the embodiments of FIGS. 4 and 5.

In the drawings, 1 denotes rods, 2 denotes a furance and 3 denotes filaments drawn out from the rods. In the conventional apparatus of FIGS. 1 and 2 the rods 1 are all the same length and are clamped to a bar 4 arranged to be moved towards the furnace 2 by a feed mechanism 5. The feed mechanism is shown only in FIGS. 2 but the apparatus of FIG. 1 employs a feed mechanism which may be the same as that illustrated in FIG. 2. 6 (FIG. 2) denotes a rotatable drum which serves as the means for drawing out the filaments and also as a receiver for the filaments bundled into a cable.

In FIG. 3 which is of apparatus according to the invention the rods 1A to 1H are of progressively decreasing length and are supported in equally spaced holders 7A and 8A fastened to the belts of two conveyors 7 and 8. Holders 7A hold the top end of the rods 1A to 1H whilst holders 8A hold the rods 1A to 1H in such a manner as to allow the rods 1A to 1H to move axially relative thereto, enabling the rods to move progressively into the furnace 2 as they are moved transversely. Filaments 3A to 3H are drawn from the rods 1A to 1H respectively and are grouped into a bundle by means of a drum similar to that shown in FIG. 2. The belt of the conveyor 7 is arranged to circulate obliquely of the axes of the rods 1A to 1H and the belt of the conveyor 8 is arranged to circulate at right angles to the axes of the said rods. 9 denotes a driving motor arranged to drive the conveyors 7 and 8, a gear mechanism 10 being effective to provide that the belts of the two conveyors circulate at speeds which remain in a fixed ratio to one another. In this construction the axes of the rods are contained in a flat plane whilst being melted.

In the construction of FIGS. 4 and 5, the furnace 2 is circular, the rods are disposed in a circular plane within the furnace, and the belts of the conveyors are guided to pursue a curved path. Otherwise the apparatus is exactly the equivalent of that illustrated in FIG. 3.

In FIG. 6, 11 denotes a light source with lens system arranged to direct a beam against the fibre 3A drawn from the fresh rod 1A occupying the position vacated by the immediately preceding rod of maximum length, 12 denotes a photoelectric cell with a lens system arranged to receive light reflected from the fibre 3A and direct said reflected light into the photoelectric cell 12, 13 denotes a relay arranged to be controlled by the photoelectric cell 12 and being arranged in turn to control the operation of a cutter mechanism 14 so disposed that when operated it will cut the filament 3A drawn from said fresh rod 1A. 15 denotes blowing means operative following operation of the cutter mechanism to blow the now free hanging leading end of the filament 3A towards the other filaments 3B-3H in the furnace at present in process of forming the bundle.

In practice, in operation of the conventional apparatus illustrated in FIGS. 1 and 2, the rods which are all the same length are fed forward into the furnace all at the same speed and in an axial direction only. The rods, being all melted at the same rate, become all at the same time the minimum length which can be conveniently held. The apparatus must then be stopped so that an entire set of fresh rods can be loaded into the apparatus. Time is thus lost and the multi-filament bundle being made comes to an end.

In operation of the apparatus according to the invention illustrated in FIGS. 3, 4, 5 and 6, the rods are moved transversely with respect to the axes of the rods by the conveyors 7 and 8, the conveyor 8, by its holders 8A imparting simple transverse motion and the conveyor 7, by its holders 7A imparting a transverse component of motion, and in addition to imparting a transverse component of motion also imparts an axial component of motion to the rods 1A to 1H. The gear ratio of the gear mechanism 10 is arranged to provide that the linear speed of the conveyor 8 has the same value as the transverse component of the speed of the conveyor 7. When each rod reaches the position 1H which is the position reached by a rod of the chosen minimum length found to be convenient the rod is removed, and when each rod is moved a chosen distance from the position 1A which is the maximum length position a fresh rod of chosen maximum length is inserted in the space vacated by the immediately preceding rod.

When a fresh rod 1A is introduced a filament 3A is drawn from the end of it. If the leading end of this filament is enlarged the quantity of light from the light source 11 reflected back to the photoelectric cell 12 will alter. The cell 12 will cause the relay 13 to operate and set in motion the cutter mechanism 14 so that the enlarged end of the filament 3A will be cut off and will drop out of the way thus leaving a new unenlarged leading end on the fibre 3A. Following operation of the cutter mechanism 14 the blowing means 15 will operate to blow the new leading end of the filament 3A towards the other filaments 3B to 3H so in the furnace that the end of filament 3A will be caught and carried into the bundle being formed.

In the manner described one rod only is replaced at a time and the process is continuous. There will be individual filament breaks at long intervals lengthwise of the finished cable, but as a break in one filament at long intervals in a bundle of fibres is not normally important a continuous multi-filament cable of any length can be manufactured without a halt.

What is claimed is:

1. Apparatus for manufacturing a continuous multi-filament light conducting cable including a furnace, feed means, holder means, connected to said feed means, for holding rods of light conducting material in parallel relationship, said feed means being operatively positioned in relation to said furnace so as to feed said rods in sequence transversely and axially into and in said furnace to melt the rods in turn into individual light conducting filaments, said holding means being adapted to hold the rods parallel during the feed-in thereof, and drawing means operative when the ends of said rods have been melted into filaments to draw such filaments into a multi-filament cable.

2. Apparatus as claimed in claim 1, in which the feed means comprises means to move the rods in a straight flat plane, the furnace being correspondingly formed.

3. Apparatus as claimed in claim 1, in which the feed means comprises means to move the rods in a curved plane, the furnace being correspondingly formed.

4. Apparatus as claimed in claim 1, in which the feed means comprises conveyor belts and the holder means comprises holders fitted to the belts.

5. Apparatus as claimed in claim 4, in which adjacent holders are all spaced the same unit of distance apart.

6. Apparatus as claimed in claim 1, in which the feed means comprises two spaced conveyor belts and the holder means comprises holders fitted to the belts, at least one of the conveyors being oblique with respect to the axes of the rods.

7. Apparatus as claimed in claim 6, in which one of the conveyors is positioned to lie at right angles to the axes of the rods so that the holders of this conveyor are capable of imparting transverse movement only to the rods, the other conveyor being positioned to lie obliquely with respect to the axes of the rods so that the holders of said other conveyor are capable of imparting a transverse component of movement to the rods and an axial component of movement for axial feed to the rods, the conveyors being geared to one another so that their rates of movement remain in the required fixed constant ratio to provide the required ratio of transverse movement and axial feed.

8. Apparatus as claimed in claim 6, in which the two conveyors are positioned so as to lie parallel with one another, but oblique with respect to the axes of the rods.

9. Apparatus as claimed in claim 7, in which the angle at which the oblique conveyor is adapted to lie with respect to the axes of the rods, is variable with respect to the axes of the rods, the gear ratio between the conveyors being correspondingly variable.

10. Apparatus as claimed in claim 8, in which the angle at which the conveyors is adapted to lie with respect to the axes of the rods, is variable with respect to the axes of the rods.

11. Apparatus as claimed in claim 1, incorporating an optical sensing device operative to sense the presence of an enlarged leading end on a filament drawn from each rod as it enters the furnace, cutter means operatively controlled by the sensing device and operative on actuation of the sensing device to cut off from the said filament the enlarged leading end and means for introducing the new leading end of the said filament into a bundle of filaments being formed by filaments from the other rods in the furnace.

12. Apparatus as claimed in claim 1, incorporating a photoelectric cell operative to sense the presence of an enlarged leading end on a filament drawn from each rod as it enters the furnace, a relay arranged to be controlled by the photoelectric cell, a cutter mechanism operative under the control of the relay and located in cutting proximity to the path of movement of said associated filament so that when operated it can cut an enlarged end off said filament whereby to leave a new leading end, and blowing means operative following operation of said cutting means to blow said new leading end towards the other filaments in the furnace when in process of forming the cable.

* * * * *